US012602941B2

(12) United States Patent
Sarvadevabhatla

(10) Patent No.: US 12,602,941 B2
(45) Date of Patent: Apr. 14, 2026

(54) SYSTEM AND METHOD FOR IDENTIFYING ATYPICAL EVENTS AND GENERATING AN ALERT USING DEEP LEARNING MODEL

(71) Applicant: International Institute of Information Technology, Hyderabad, Hyderabad (IN)

(72) Inventor: Ravi Kiran Sarvadevabhatla, Hyderabad (IN)

(73) Assignee: INTERNATIONAL INSTITUTE OF INFORMATION TECHNOLOGY, HYDERABAD, Hyderabad (IN)

( * ) Notice: Subject to any disclaimer, the term of this patent is extended or adjusted under 35 U.S.C. 154(b) by 935 days.

(21) Appl. No.: 17/871,901

(22) Filed: Jul. 23, 2022

(65) Prior Publication Data

US 2024/0029459 A1      Jan. 25, 2024

(51) Int. Cl.
| | |
|---|---|
| *G06V 20/70* | (2022.01) |
| *G06N 3/08* | (2023.01) |
| *G06T 11/20* | (2006.01) |
| *G06V 10/77* | (2022.01) |
| *G06V 10/776* | (2022.01) |
| *G06V 30/32* | (2022.01) |
| *G08B 5/22* | (2006.01) |

(52) U.S. Cl.
CPC ............... *G06V 20/70* (2022.01); *G06N 3/08* (2013.01); *G06T 11/203* (2013.01); *G06V 10/7715* (2022.01); *G06V 10/776* (2022.01); *G06V 30/347* (2022.01); *G08B 5/22* (2013.01)

(58) Field of Classification Search
CPC .. G06V 20/70; G06V 10/7715; G06V 10/776;
G06V 30/347; G06V 10/82; G06V 30/1801; G06V 40/28; G06N 3/08; G06N 3/045; G06T 11/203; G08B 5/22
See application file for complete search history.

(56) References Cited

U.S. PATENT DOCUMENTS

| | | | |
|---|---|---|---|
| 2004/0237033 A1* | 11/2004 | Woolf | G06Q 10/10 |
| | | | 715/230 |
| 2015/0064681 A1* | 3/2015 | Stahovich | G06V 30/347 |
| | | | 434/350 |
| 2017/0068854 A1* | 3/2017 | Markiewicz | G06V 30/36 |
| 2018/0052813 A1* | 2/2018 | Laupretre | G06Q 10/101 |
| 2018/0300302 A1* | 10/2018 | Holley | G06F 40/171 |
| 2021/0073530 A1* | 3/2021 | Schaefer | G06V 30/422 |
| 2023/0315271 A1* | 10/2023 | Milne | G06F 21/44 |
| | | | 715/754 |

* cited by examiner

*Primary Examiner* — Keith D Bloomquist

(57) ABSTRACT

The embodiments herein relate to a system and a method identifying and generating an alert, using a deep learning model, for atypical events during an activity on an electronic whiteboard. The system includes a user device associated with a user, and an atypical event detecting server. The atypical event detecting server (i) receives one or more canvases at concurrent sessions, (ii) annotates the one or more canvases, (iii) detects historical atypical events from the annotated one or more canvases, (iv) trains the deep learning model by correlating the historical atypical events, historical bounding boxes with historical canvases in historical sessions, (v) processes the one or more canvases by determining a bounding box around each atypical event, and (vi) generates an alert for identified atypical events using an event record table.

14 Claims, 10 Drawing Sheets

RECEIVING ONE OR MORE CANVASES AT CONCURRENT SESSIONS FROM A USER DEVICE ASSOCIATED WITH USER

802

ANNOTATING THE OE OR MORE CANVASES BY (I) DISPLAYING STROKES FROM EACH CANVAS OF A SESSION, (II) ASSIGNING LABELS FOR THE STROKES BY SELECTING AT LEAST ONE CATEGORY RELATED TO ANY OF ONE OR MORE ATYPICAL EVENTS PRESENT IN A MENU BAR OF THE ANNOTATION INTERFACE, (III) ENABLING AN INSTANCE-LEVEL ANNOTATION FOR EACH CATEGORY THAT INCLUDES THE STROKES TO SELECT A CONTIGUOUS GROUP OF SKETCHES, AND (IV) HIGH-LIGHTING THE STROKES BELONGING TO THE CONTIGUOUS GROUP OF SKETCHES TO OBTAIN ANNOTATED ONE OR MORE CANVASES

804

DETECTING HISTORICAL ATYPICAL EVENTS FROM THE ANNOTATED ONE OR MORE CANVASES BY (I)DETECTING, USING AN IMAGE-BASED OBJECT DETECTION, THE HIGH-LIGHTED STROKES OF THE CONTIGUOUS GROUP OF SKETCHES TO REPRESENT AS SPATIALLY LOCALIZED OBJECTS, (II) EXTRACTING ONE OR MORE FEATURES FROM THE SPATIALLY LOCALIZED OBJECTS, AND (III) GENERATING FEATURE MAPS FROM THE EXTRACTED FEATURES

808

FIG. 8A

PROCESSING, USING THE DEEP LEARNING MODEL, THE ONE OR MORE CANVASES BY DETERMINING A BOUNDING BOX AROUND EACH ATYPICAL EVENT, THEREBY IDENTIFYING THE ONE OR MORE ATYPICAL EVENTS DURING THE ACTIVITY ON THE ELECTRONIC WHITEBOARD USING THE BOUNDING BOX AROUND EAH ATYPICAL EVENT

810

GENERATING, USING AN EVENT RECORD TABLE, AN ALERT FOR IDENTIFIED ONE OR MORE TYPICAL EVENTS BY (I) RECORDING ATYPICAL EVENT INFORMATION RELATED TO ON-GOING SESSIONS, (II) ANALYZING, USING A RULE BASE METHOD, THE ATYPICAL EVENT INFORMATION TO GENERATE ANAPPROPRIATE ALERT ON AN USER INTERFACE OF THE USER DEVICE ASSOCIATED WITH THE USER

SYSTEM AND METHOD FOR IDENTIFYING ATYPICAL EVENTS AND GENERATING AN ALERT USING DEEP LEARNING MODEL

CROSS-REFERENCE TO RELATED APPLICATIONS

This patent application claims priority to Indian provisional patent application 202141033193 filed on Jul. 23, 2021, the complete disclosures of which, in their entirety, are hereby incorporated by reference.

TECHNICAL FIELD

The embodiments herein generally relate to a deep learning model, more particularly to a system and method for identifying and generating an alert, using the deep learning model, for atypical events during an activity on an electronic whiteboard.

DESCRIPTION OF THE RELATED ART

In modern times, there has been an increasing proliferation of digital canvas interfaces such as interactive whiteboards and tablet-style devices. These find popular usage in educational and workplace settings as a natural mechanism for collaboration and communication. Within this variety of settings, many usage scenarios involve shared whiteboards. This sharing aspect offers tremendous scope for interaction and a richer session experience.

However, shared whiteboards also create situations where malicious participants can indulge in atypical activities such as graffiti-style scribbling, writing, and drawing controversial content. Since these atypical activities impair the collective experience of participants, it is important to have mechanisms in place for identifying and tackling atypical whiteboard events.

Existing systems employ sketch object recognition. The existing systems fail to include parts of speech like verbs and adjectives. Also, existing systems fail to accommodate interactivity and non-sketch drawing canvas events like erase, pointing emphasis, etc.

Another existing system employs a stroke segmentation model for labelling parts in object sketches either from stroke sequence information or within an image canvas. But the existing system assumes to have strokes of predefined components classes. The existing system fails to detect components from highly variable sketch sequences.

Another existing system employs a text localization model for localizing text in outdoor scenes and handwritten documents. The existing system confines a high degree of regularity in structure in the case of outdoor scenes and handwritten documents. The existing system fails to employ where there is no regularity of structural components.

Accordingly, there remains a need for a system and method to address the aforementioned technical drawbacks in existing technologies.

SUMMARY

In view of foregoing, an embodiment herein provides a processor-implemented method for identifying and generating an alert, using a deep learning model, for atypical events during an activity on an electronic whiteboard. The method includes receiving one or more canvases at concurrent sessions from a user device associated with a user. Each canvas includes strokes. Each stroke is a timestamped scalable vector graphics element. The method includes annotating the one or more canvases by (i) displaying the strokes from each canvas of a session, (ii) assigning labels for the strokes by selecting at least one category related to any of the one or more atypical events, (iii) enabling an instance-level annotation for each category that includes the strokes to select a contiguous group of sketches, and (iv) highlighting the strokes belonging to the contiguous group of sketches to obtain annotated one or more canvases. The method includes detecting historical atypical events from the annotated one or more canvases by (i) detecting, using image-based object detection, the high-lighted strokes of the contiguous group of sketches to represent as spatially localized objects (ii) extracting one or more features from the spatially localized objects, and (iii) generating feature maps from the extracted features. The method includes training the deep learning model by correlating the historical atypical events, and historical bounding boxes with historical canvases in historical sessions to obtain a trained deep learning model. The method includes processing, using the deep learning model, the one or more canvases by determining a bounding box around each atypical event, thereby identifying the one or more atypical events during the activity on the electronic whiteboard using the bounding box around each atypical event. The method includes generating, using an event record table, an alert for identified one or more typical events by (i) recording atypical event information related to on-going sessions, (ii) analyzing, using a rule base method, the atypical event information to generate an appropriate alert by relaying to an appropriate session, thereby displaying the appropriate alert on a user interface of the user device associated with the user.

In some embodiments, the method includes optimizing the trained deep learning model by calculating (i) a classification loss using confidence scores between ground truth offsets and predicted offsets, and (ii) a bounding-box localization loss using distance intersection over union (IoU) loss.

In some embodiments, the method includes (i) grouping the strokes of the historical atypical events into subsequences that are separated by erase stroke subsequences, (ii) converting curves of the strokes to a point sequence representation, (iii) down-sampling, using ramer-douglas-peucker method, the point sequence representation adaptively to obtain points, (iv) rendering the points on a canvas for data annotation and representation, and (v) labelling the annotated and represented points to automatically generate the ground truth offsets to train the deep learning model.

In some embodiments, the method further includes, augmenting the historical atypical events in the historical sessions to train the deep learning model by, (i) isolating subsequences of the strokes of the historical atypical events, (ii) sampling the subsequences of the strokes of a current session and adding the subsequences of the strokes with the next sessions that do not contain the historical atypical events to obtain sampled subsequences, and (iii) ensuring the sampled subsequences are spatially disjoint from the strokes of the sessions by localizing the sampled subsequences.

In some embodiments, the one or more atypical events include at least one of text, numericals, circles, or iconics, the at least one category related to any of the one or more atypical events present in a menu bar of an annotation interface includes running hand letters, circles, arrows, question marks, sketch, individual letter, numbers In some embodiments, the method further includes (i) grouping the strokes into consecutive subsequences of erase strokes, and (ii) generating a new session by taking stroke subsequence from a first stroke of the concurrent sessions to a first stroke of one of erase subsequences.

In one aspect, there is provided one or more non-transitory computer-readable storage mediums storing one or more sequences of instructions, which when executed by one or more processors, causes a method for identifying and generating an alert, using a deep learning model, for atypical events during an activity on an electronic whiteboard. The method includes receiving one or more canvases at concurrent sessions from a user device associated with a user. Each canvas includes strokes. Each stroke is a timestamped scalable vector graphics element. The method includes annotating the one or more canvases by (i) displaying the strokes from each canvas of a session, (ii) assigning labels for the strokes by selecting at least one category related to any of the one or more atypical events, (iii) enabling an instance-level annotation for each category that includes the strokes to select a contiguous group of sketches, and (iv) high-lighting the strokes belonging to the contiguous group of sketches to obtain annotated one or more canvases. The method includes detecting historical atypical events from the annotated one or more canvases by (i) detecting, using an image-based object detection, the high-lighted strokes of the contiguous group of sketches to represent as spatially localized objects (ii) extracting one or more features from the spatially localized objects, and (iii) generating feature maps from the extracted features. The method includes training the deep learning model by correlating the historical atypical events, and historical bounding boxes with historical canvases in historical sessions to obtain a trained deep learning model. The method includes processing, using the deep learning model, the one or more canvases by determining a bounding box around each atypical event, thereby identifying the one or more atypical events during the activity on the electronic whiteboard using the bounding box around each atypical event. The method includes generating, using an event record table, an alert for identified one or more typical events by (i) recording atypical event information related to on-going sessions, (ii) analyzing, using a rule base method, the atypical event information to generate an appropriate alert by relaying to an appropriate session, thereby displaying the appropriate alert on a user interface of the user device associated with the user.

In another aspect, a system for identifying and generating an alert, using a deep learning model, for atypical events during an activity on an electronic whiteboard is provided. The system includes a memory that stores a database and a set of instructions and a processor that is configured to execute the set of instructions and is configured to (i) receive one or more canvases at concurrent sessions from a user device associated with a user, each canvas includes strokes, each stroke is a timestamped scalable vector graphics element, (ii) annotate the one or more canvases by (a) displaying the strokes from each canvas of a session, (b) assigning labels for the strokes by selecting at least one category related to any of the one or more atypical events, (c) enabling an instance-level annotation for each category that includes the strokes to select a contiguous group of sketches, and (d) high-lighting the strokes belonging to the contiguous group of sketches to obtain annotated one or more canvases, (iii) detect historical atypical events from the annotated one or more canvases by (a) detecting, using an image-based object detection, the high-lighted strokes of the contiguous group of sketches to represent as spatially localized objects (b) extracting one or more features from the spatially localized objects, and (c) generating feature maps from the extracted features, (iv) train the deep learning model by correlating the historical atypical events, historical bounding boxes with historical canvases in historical sessions to obtain a trained deep learning model, (v) process, using the deep learning model, the one or more canvases by determining a bounding box around each atypical event, thereby identifying the one or more atypical events during the activity on the electronic whiteboard using the bounding box around each atypical event, and (vi) generate, using an event record table, an alert for identified one or more atypical events by (a) recording atypical event information related to on-going sessions, (b) analyzing, using a rule base method, the atypical event information to generate an appropriate alert by relaying to an appropriate session, thereby displaying the appropriate alert on an user interface of the user device associated with the user.

In some embodiments, the processor is configured to include optimizing the trained deep learning model by calculating (i) a classification loss using confidence scores between ground truth offsets and predicted offsets, and (ii) a bounding-box localization loss using distance intersection over union (IoU) loss.

In some embodiments, the processor is configured to include (i) grouping the strokes of the historical atypical events into subsequences that are separated by erase stroke subsequences, (ii) converting curves of the strokes to a point sequence representation, (iii) downsampling, using ramer-douglas-peucker method, the point sequence representation adaptively to obtain points, (iv) rendering the points on a canvas for data annotation and representation, and (v) labelling the annotated and represented points to automatically generate the ground truth offsets to train the deep learning model.

In some embodiments, the processor is configured to further include augmenting the historical atypical events in the historical sessions to train the deep learning model by, (i) isolating subsequences of the strokes of the historical atypical events, (ii) sampling the subsequences of the strokes of a current session and adding the subsequences of the strokes with the next sessions that do not contain the historical atypical events to obtain sampled subsequences, and (iii) ensuring the sampled subsequences are spatially disjoint from the strokes of the sessions by localizing the sampled subsequences.

In some embodiments, the one or more atypical events include at least one of text, numerical, circles, or iconic, the at least one category related to any of the one or more atypical events present in a menu bar of an annotation interface includes running hand letters, circles, arrows, question marks, sketch, individual letter, numbers In some embodiments, the processor is configured to further include (i) grouping the strokes into consecutive subsequences of erase strokes, and (ii) generating a new session by taking stroke subsequence from a first stroke of the concurrent sessions to a first stroke of one of erasing subsequences.

The system and method for detecting and responding to atypical events in real-time using a deep learning model is provided. The system handles multiple scenarios such as an online lecture with interactive whiteboard sharing, an online presentation, etc. The system manages multiple models, to distribute workload, and provide more throughput. The system detects atypical events in multiple scenarios and alerts the organizer. The system distinguishes between rule-violation and non-rule-violation as atypical events set by the organizer. The system enables organizers/users to provide feedback about alerts that can be used to calibrate and improve the reliability of the system. The system handles multiple canvas representations like vector graphics, images, etc., and transforms them into similar representations. The system detects atypical events in a scalable, reliable, comprehensive, and time-efficient manner.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIGS. 8A and 8B illustrate a method for identifying and generating an alert, using a deep learning model, for atypical events during an activity on an electronic whiteboard according to some embodiments herein.

DETAILED DESCRIPTION OF PREFERRED EMBODIMENTS

Figure 1:
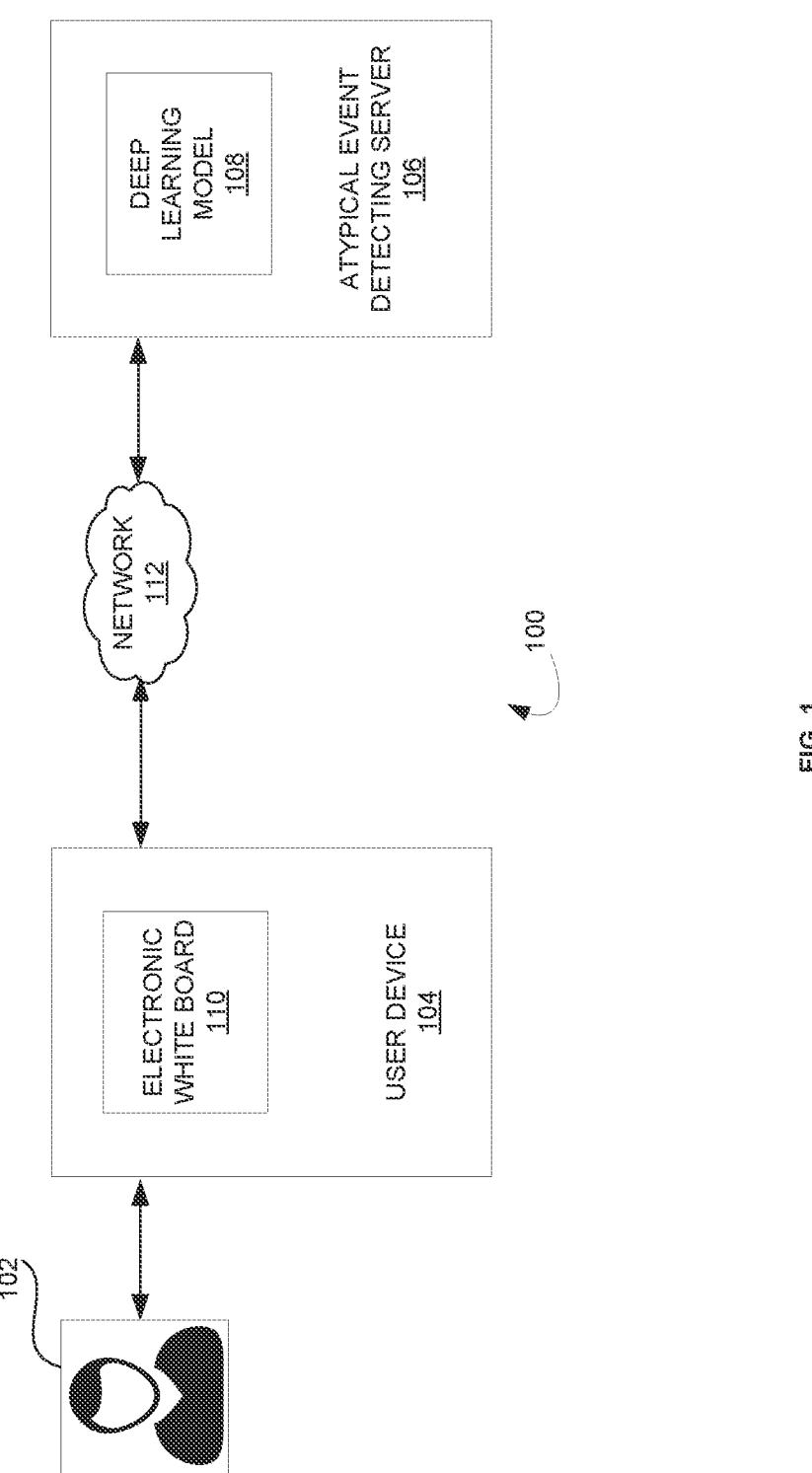
FIG. 1 is a block diagram of a system for identifying and generating an alert, using a deep learning model, for atypical events during an activity on an electronic whiteboard according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a system and method to detect and respond to atypical events on an electronic whiteboard using a deep learning model to handle multiple scenarios such as an online lecture with interactive whiteboard sharing, an online presentation, etc. Referring now to the drawings, and more particularly to FIGS. 1 through 9, where similar reference characters denote corresponding features consistently throughout the figures, preferred embodiments are shown.

FIG. 1 is a block diagram of a system 100 for identifying and generating an alert, using a deep learning model 108, for atypical events during an activity on an electronic whiteboard 110 associated with a user device 104 according to some embodiments herein. The system 100 includes the user device 104 associated with a user 102, and an atypical event detecting server 106. A list of devices that are capable of functioning as the atypical event detecting server 106, without limitation, may include one or more of a personal computer, a laptop, a tablet device, a smartphone, a mobile communication device, a personal digital assistant, or any other such computing device.

In some embodiments, the user device 104 may be a mobile phone, a kindle, a PDA (Personal Digital Assistant), a tablet, a music player, a computer, an electronic notebook or a smartphone. The atypical event detecting server 106 may communicate with the user device 104 through a network 112. In some embodiments, the network 112 is a wired network. In some embodiments, the network 112 is a wireless network. In some embodiments, the network 112 is a combination of a wired network and a wireless network. In some embodiments, the network 112 is the Internet.

The atypical event detecting server 106 receives one or more canvases at concurrent sessions from the user device 104 associated with the user 102. Each canvas includes strokes. Each stroke is a timestamped scalable vector graphics (SVG) element. In some embodiments, the atypical event detecting server 106 queues the one or more canvases based on corresponding session identifier information. The corresponding session identifier information includes an identification number provided to a session, time stamp of the session. Each canvas is an accumulated canvas content input associated with at least one session. Each canvas with its corresponding session identifier information communicates to a session canvas queue.

In some embodiments, the atypical event detecting server 106 de-queues a canvas from a queue of one or more canvases that is compatible with deep network processing. In some embodiments, the atypical event detecting server 106 includes one or more detection modules that process the canvas. A first module provides the canvas as a rendered binary image. A second module processes the rendered binary image.

The atypical event detecting server 106 annotates the one or more canvases. The atypical event detecting server 106 displays the strokes from each canvas of a session. The atypical event detecting server 106 assigns labels for the strokes by selecting at least one category related to any of the atypical events present in a menu bar of an annotation interface.

The strokes are grouped into subsequences that are separated by erase stroke subsequences. The strokes include curves. The curves of the strokes are converted into a point sequence representation. The point sequence representation of the curves is down-sampled to obtain points. The points are obtained using ramer-douglas-peucker method. The points are rendered for data annotation and representation.

The annotated and represented points are labelled automatically to generate ground truth offsets to train the deep learning model.

The atypical event detecting server 106 enables an instance-level annotation for each category that includes the strokes to select a contiguous group of sketches. The atypical event detecting server 106 high-lights the strokes belonging to the contiguous group of sketches to obtain annotated one or more canvases. The atypical event detecting server 106 detects historical atypical events from the annotated one or more canvases. The atypical event detecting server 106 detects the high-lighted strokes of the contiguous group of sketches using an image-based object detection. The high-lighted strokes are represented as spatially localized objects. The atypical event detecting server 106 extracts one or more features from the spatially localized objects. The atypical event detecting server 106 generates feature maps from the extracted features.

In some embodiments, the historical atypical events in the historical sessions are augmented to train the deep learning model by (i) isolating subsequences of the strokes of the historical atypical events, (ii) sampling the subsequences of the strokes of a current session and adding the subsequences of the strokes with the next sessions that do not contain the historical atypical events to obtain sampled subsequences, and (iii) ensuring the sampled subsequences are spatially disjoint from the strokes of the sessions by localizing the sampled subsequences.

The deep learning model 108 is trained by correlating the historical atypical events, historical bounding boxes with historical canvases in historical sessions to obtain a trained deep learning model.

The atypical event detecting server 106 processes the one or more canvases by determining a bounding box around each atypical event using the deep learning model. Thereby, the atypical events are identified during the activity on the electronic whiteboard using the bounding box around each atypical event. The identified atypical events may be text events where the user writes a text that is considered as atypical data, numerical events where the user writes numbers on the electronic whiteboard, circles events where the user circles to emphasize canvas content, iconic events where the user emphasize abstract content like a question mark, arrow, double-headed arrow, tick marks, addition symbol, cross, and striking out the sketch.

Optionally, a single sketch stroke is split into multiple sub-strokes, for example, a word written in a running hand can be split into individual letters and annotated.

The atypical event detecting server 106 generates an alert for identified atypical events using an event record table by (i) recording atypical event information related to on-going sessions, (ii) analyzing, using a rule base method, the atypical event information to generate an appropriate alert by relaying to an appropriate session, thereby displaying the appropriate alert on an user interface of the user device associated with the user. The rule base method may store rules and automatically apply the appropriate rule on the identified atypical event and generate appropriate alert, for example, if the atypical event is a numerical, then a buzzer sound may be produced from a speaker of the user device 104. If the atypical event is a question mark, then an cross symbol is shown on a screen of the user device 104.

Figure 2:
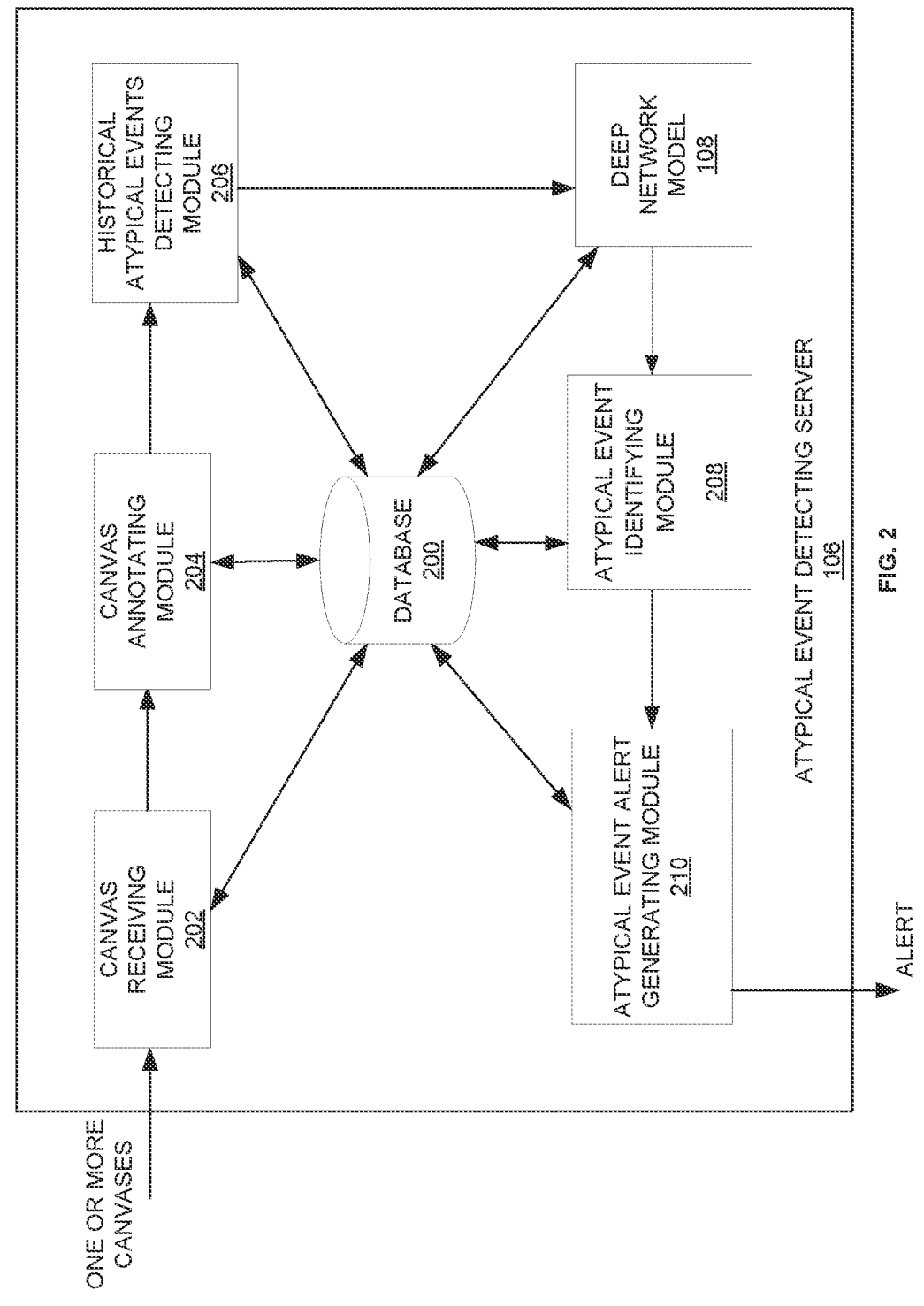
FIG. 2 is a block diagram of an atypical event detecting server according to some embodiments herein.

FIG. 2 is a block diagram of the atypical event detecting server 106 according to some embodiments herein. The atypical event detecting server 106 includes a database 200, a canvas receiving module 202, a canvas annotating module 204, a historical atypical events detecting module 206, a deep learning model 108, an atypical event identifying module 208, and an atypical event alert generating module 210. The database 200 may be communicatively connected with one or more modules of the atypical event detecting server 106.

The canvas receiving module 202 receives one or more canvases at concurrent sessions from the user device 104 associated with the user 102. The canvas annotating module 204 annotates the one or more canvases by (i) displaying the strokes from each canvas of a session, (ii) assigning labels for the strokes by selecting at least one category related to any of the atypical events present in a menu bar, (iii) enables an instance-level annotation for each category that includes the strokes to select a contiguous group of sketches, and (iv) high-lights the strokes belonging to the contiguous group of sketches to obtain annotated one or more canvases.

The historical atypical events detecting module 206 detects the high-lighted strokes of the contiguous group of sketches using an image-based object detection. The high-lighted strokes are represented as spatially localized objects. The atypical event detecting server 106 extracts one or more features from the spatially localized objects. The atypical event detecting server 106 generates feature maps from the extracted features.

The deep learning model 108 is trained by correlating the historical atypical events, historical bounding boxes with historical canvases in historical sessions to obtain a trained deep learning model.

The atypical event identifying module 208 processes the one or more canvases by determining a bounding box around each atypical event using the deep learning model. Thereby, the atypical events are identified during the activity on the electronic whiteboard using the bounding box around each atypical event.

The atypical event alert generating module 210 generates an alert for identified atypical events using an event record table by (i) recording atypical event information related to on-going sessions, (ii) analyzing, using a rule base method, the atypical event information to generate an appropriate alert by relaying to an appropriate session, thereby displaying the appropriate alert on an user interface of the user device associated with the user.

Figure 3:
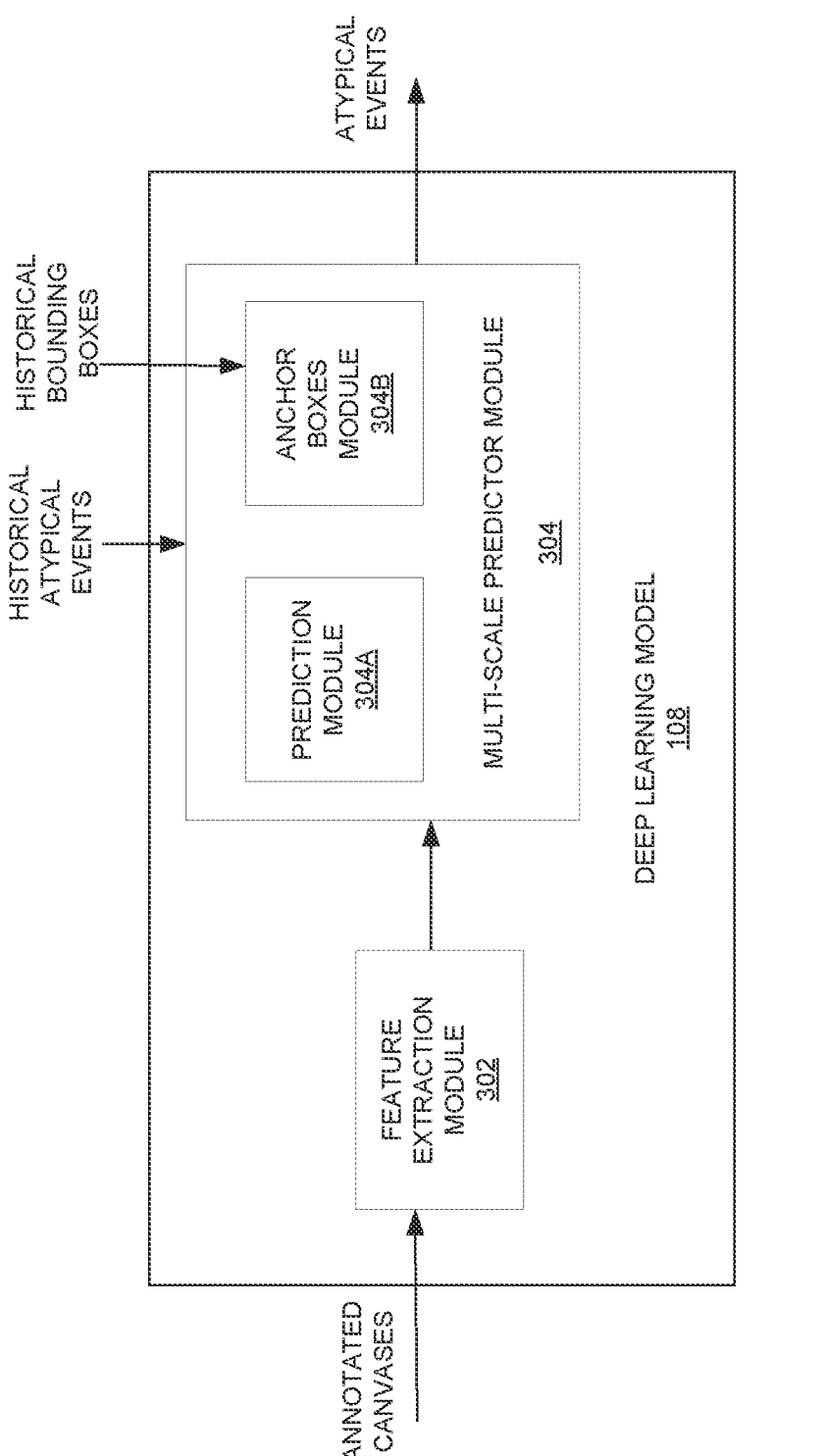
FIG. 3 is a block diagram of a deep learning model of FIG. 1 according to some embodiments herein.

FIG. 3 is a block diagram of the deep learning model 108 of FIG. 1 according to some embodiments herein. The deep learning model 108 includes a feature extractor module 302, a multi-scale predictor module 304. The feature extractor module 302 obtains at least one canvas for deep network processing. The feature extractor module 302 extracts one or more features from annotated canvases to detect atypical data, for example, text. The features are extracted using (i) a stem block of the annotated canvas, (ii) 3×3 unit structure of the annotated canvas. The multi-scale predictor module 304 includes a prediction module 304A and an anchor boxes module 304B. The prediction module 304A generates multi-scale maps over the extracted features and generates predictions of bounding boxes over the atypical data of the canvas. The anchor boxes module 304B generates the bounding boxes of different sizes based on the size of the atypical data using historical bounding boxes. The bounding boxes are generated with aspect ratios to 1, 2, 3, 4, 5, 1/2, 1/3, 1/5 with a vertical offset +/−0.25.

In some embodiments, the trained deep learning model 108 is optimized by calculating (i) a classification loss using confidence scores between ground truth offsets and predicted offsets, and (ii) a bounding-box localization loss using distance intersection over union (IoU) loss.

The following table 1 depicts performance scores of the trained deep learning model when compared with existing models.

TABLE 1

| Type of model | Component | Details | mAP | |
|---|---|---|---|---|
| Architectural deep learning model | Feature extractor | Reduce number of dense segments (−1) | 0.46 | 0.77 |
| | | | 0.49 | 0.72 |
| | | Increase number of dense segments (+1) Including output of SC transition layer-2 among prediction feature maps | 0.64 | 0.78 |
| Deep learning model with optimization | Multi-scale predictor | Reduce down sampling blocks | 0.60 | 0.8 |
| | Not applicable | Replace separable convolution with regular convolution | 0.42 | 0.66 |
| | | Cross entropy loss for classification | 0.45 | 0.86 |
| | | L1 loss for regression | 0.60 | 0.79 |
| | | | 0.25 | 0.57 |
| | | | 0.45 | 0.71 |
| | | Deep learning model without optimization 108 | 0.71 | 0.82 |

Figure 4:
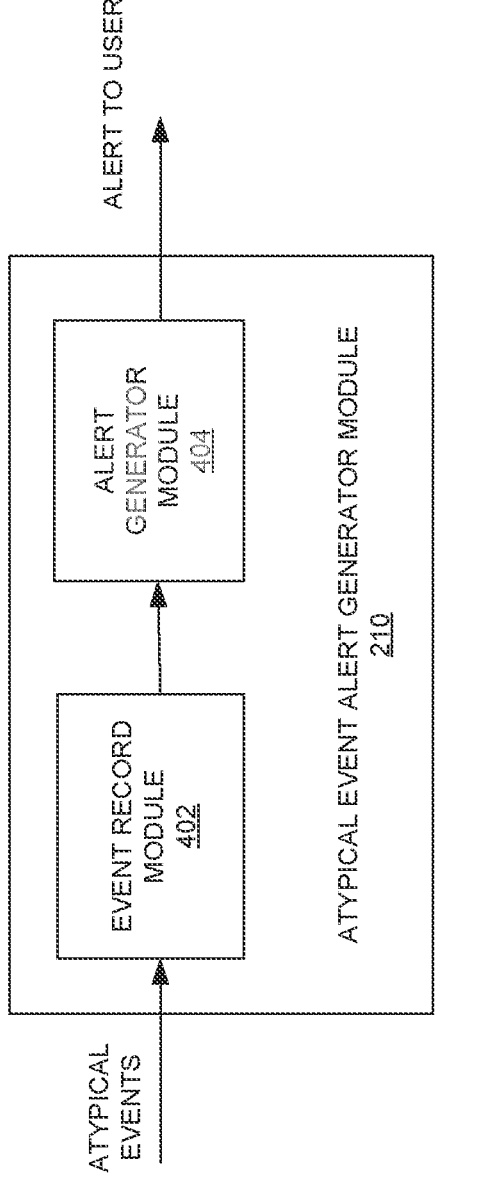
FIG. 4 is a block diagram of an atypical event alert generating module of the atypical event detecting server of FIG. 2 according to some embodiments herein.

FIG. 4 is a block diagram of an atypical event alert generating module 210 of the atypical event detecting server 106 of FIG. 2 according to some embodiments herein. The atypical event alert generating module 210 of the atypical event detecting server 106 includes an event record module 406, and an alert generator module 408. The event record module 406 records information that is related to atypical events and one or more sessions. The recorded information is analysed by the deep learning model 108. The alert generator module 408 generates alerts and communicates to appropriate sessions. The alerts may be displayed on the user interface of the user device 104 associated with the user 102.

Figure 5:
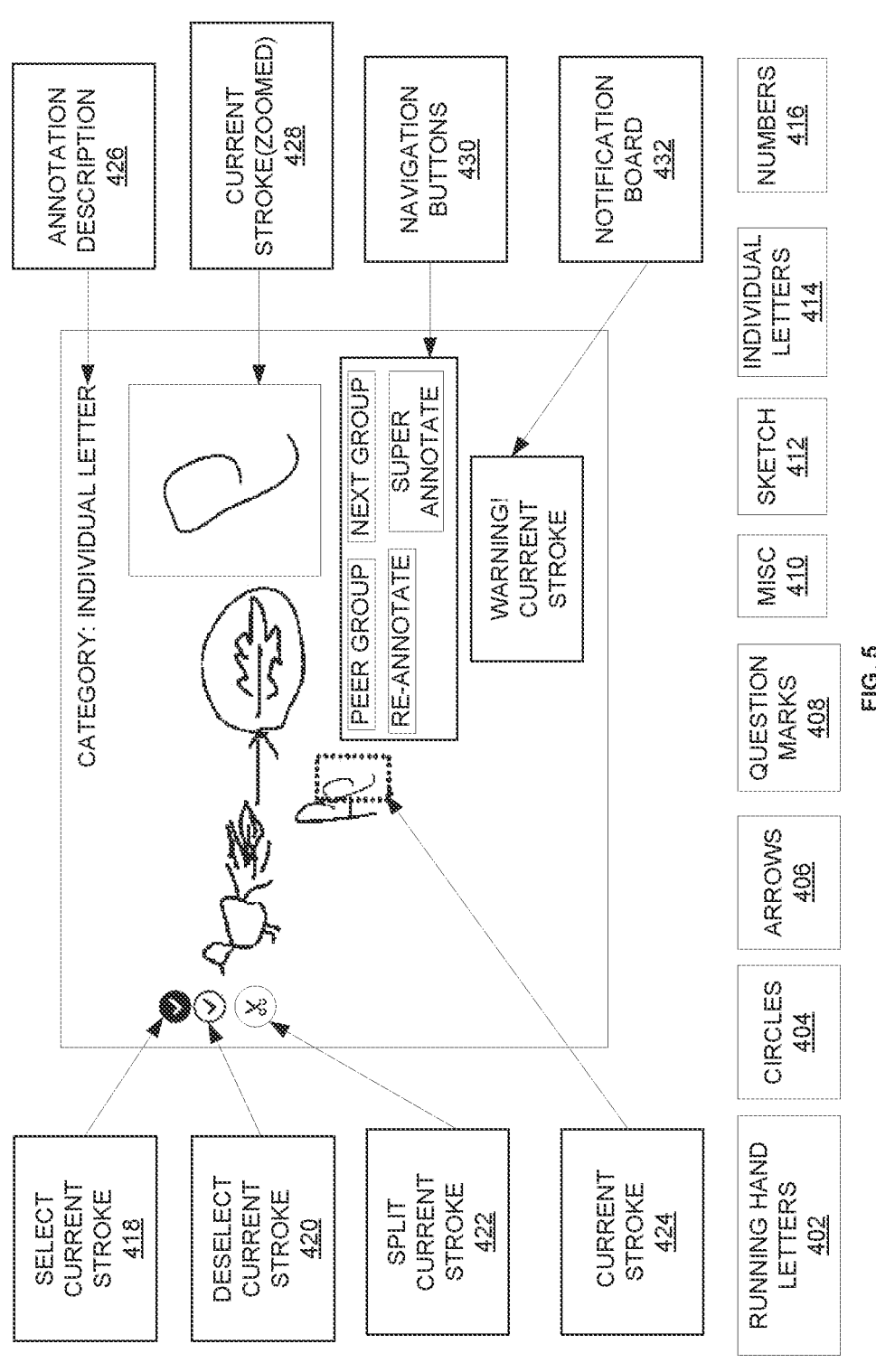
FIG. 5 illustrates an exemplary view of assigning labels for historical atypical events according to some embodiments herein.

FIG. 5 is an exemplary view of assigning labels for historical atypical events according to some embodiments herein. The exemplary view of assigning the labels for the historical atypical events includes running hand letters 502, circles 504, arrows 506, question marks 508, misc 510, sketch 512, individual letters 514, and numbers 516 as categories of annotation. For grouping and splitting atypical data, select current stroke at 518, deselect current stroke at 520, and split current stroke at 522 are used. The current stroke at 524 is highlighted for annotating atypical data. An annotation description 526 describes the annotation as "category: individual letter". The current stroke (zoomed) 528 is highlighted for annotating atypical data in zoom. The navigation buttons 528 include peer group, next group, re-annotate, super annotate. The notification board 530 displays an alert on the identified atypical events as shown in FIG. 5 as "warning: current stroke".

Figures 6A, 6B:
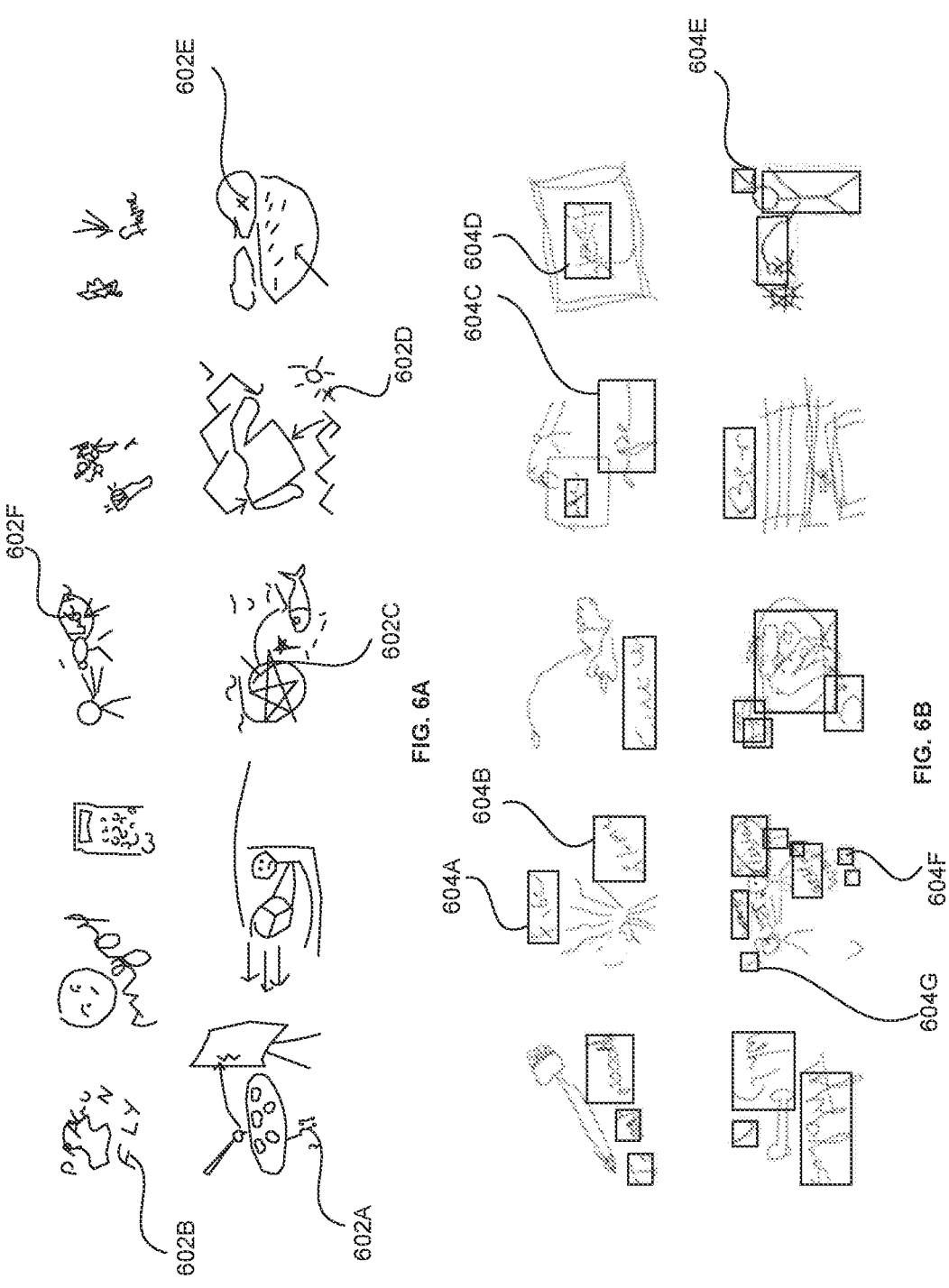
FIGS. 6A and 6B are exemplary views of atypical events and identified atypical events with bounding box according to some embodiments herein.

FIGS. 6A and 6B are exemplary views of atypical events and identified atypical events with bounding box according to some embodiments herein. FIG. 6A depicts the atypical events at 602A, 602B, 602C, 602D, 602E, 602F. At 602A, a question mark is identified as the atypical event. At 602B, a text is identified as the atypical event. At 602C, a circle is identified as the atypical event. At 602D, 602E a cross-mark is identified as the atypical event. At 602F, a text is identified as the atypical event.

FIG. 6B depicts the atypical events with bounding box at 604A, 604B, 604C, 604D, 604E, 604F, and 604G. At 604A, 604B, 604C, 604D a text is identified as the atypical event. At, a circle is identified as the atypical event. At, 604E a tick-mark is identified as the atypical event. At 604G, a numerical is identified as the atypical event.

Figure 7:
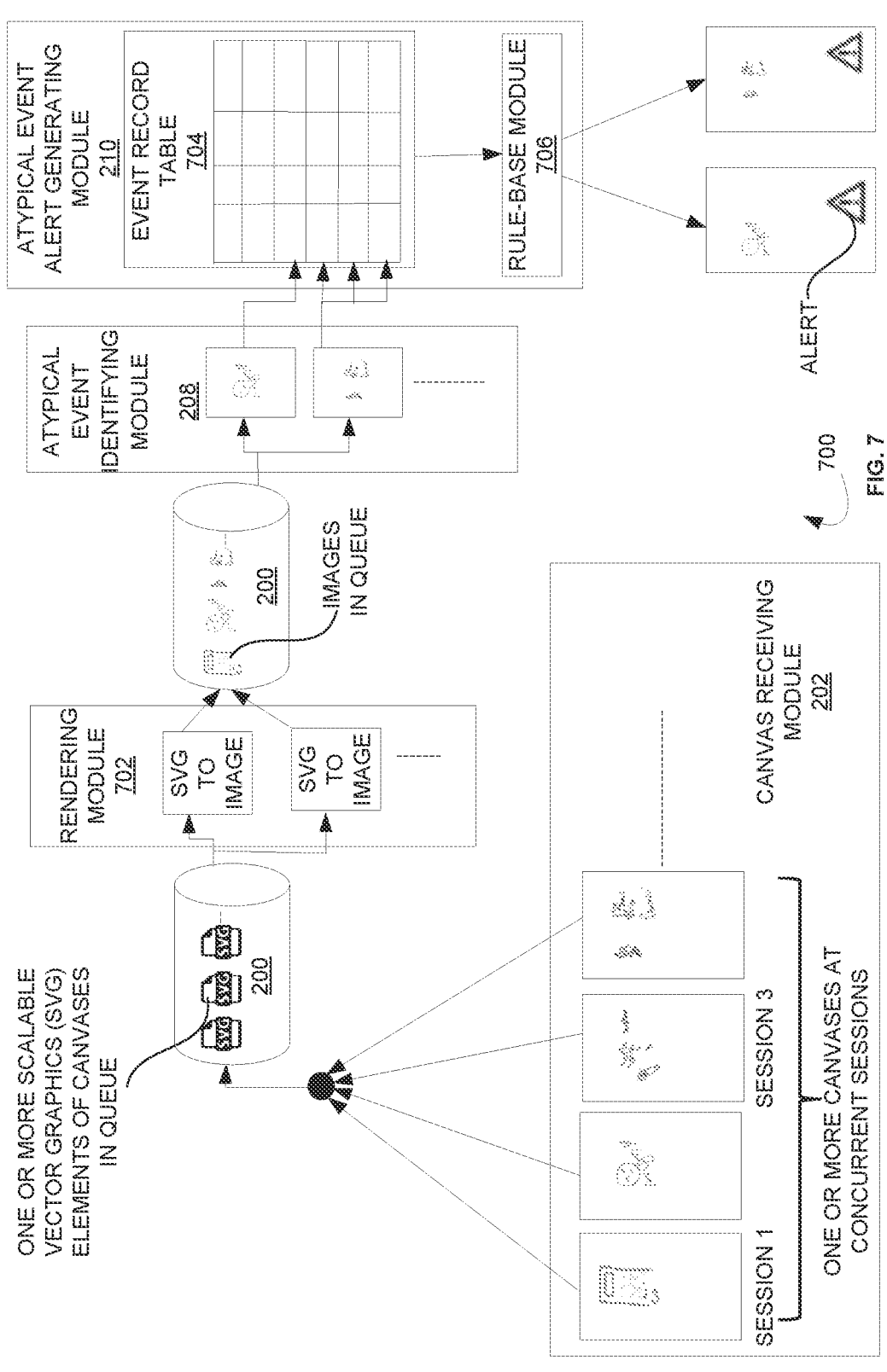
FIG. 7 illustrates an exemplary view of flow diagram of identifying and generating an alert, using a deep learning model, for atypical events during an activity on an electronic whiteboard according to some embodiments herein.

FIG. 7 illustrates an exemplary flow diagram 700 of identifying and generating an alert, using a deep learning model, for atypical events during an activity on an electronic whiteboard according to some embodiments herein. The exemplary flow diagram 700 includes receiving one or more canvases at concurrent sessions by a canvas receiving module 210. The one or more canvases are stored as timestamped scalable vector graphics (SVG) elements in the database 200 in a queue. The queue is formed based on timestamps of each SVG element of the canvas. The SVG elements of the canvases are rendered as images using rendering module 702. The rendered images are stored in the database 200 in the same order as they are stored in the order as the SVG elements. The atypical event identifying module 208 identifies the one or more atypical events in the rendered images using the bounding box around each atypical event. The atypical events along with the bounding box are recorded in an event record table 704. The event record table 704 includes atypical event information, for example, type of the atypical event, session identification number, bounding box. The rule base module analyses the atypical event information for identified one or more atypical events to generate an appropriate alert to the user 102 as shown in the figure.

FIGS. 8A and 8B illustrate a method for identifying and generating an alert, using a deep learning model, for atypical events during an activity on an electronic whiteboard according to some embodiments herein. At step 802, the method includes, receiving one or more canvases at concurrent sessions from a user device associated with a user. Each canvas includes strokes. Each stroke is a timestamped scalable vector graphics element. At step 804, the method includes, annotating the one or more canvases by (i) displaying the strokes from each canvas of a session, (ii) assigning labels for the strokes by selecting at least one category related to any of the one or more atypical events present in a menu bar, (iii) enabling an instance-level annotation for each category that includes the strokes to select a contiguous group of sketches, and (iv) high-lighting the strokes belonging to the contiguous group of sketches to obtain annotated one or more canvases. At step 806, the method includes, detecting historical atypical events from the annotated one or more canvases by (i) detecting, using an image-based object detection, the high-lighted strokes of the contiguous group of sketches to represent as spatially localized objects, (ii) extracting one or more features from the spatially localized objects, and (iii) generating feature maps from the extracted features. At step 808, the method includes, training the deep learning model by correlating the historical atypical events, historical bounding boxes with historical canvases in historical sessions to obtain a trained deep learning model. At step 810, the method includes, processing, using the deep learning model, the one or more canvases by determining a bounding box around each atypical event, thereby identifying the one or more atypical events during the activity on the electronic whiteboard using the bounding box around each atypical event. At step 812, the method includes generating, using an event record table, an alert for identified one or more atypical events by (i) recording atypical event information related to on-going sessions, (ii) analyzing, using a rule base method, the atypical event information to generate an appropriate alert by relaying to an appropriate session, thereby displaying the appropriate alert on an user interface of the user device associated with the user.

In some embodiments, the method includes optimizing the trained deep learning model by calculating (i) a classification loss using confidence scores between ground truth offsets and predicted offsets, and (ii) a bounding-box localization loss using distance intersection over union (IoU) loss.

In some embodiments, the method includes (i) grouping the strokes of the historical atypical events into subsequences that are separated by erase stroke subsequences, (ii) converting curves of the strokes to a point sequence representation, (iii) down sampling, using ramer-douglas-peucker method, the point sequence representation adaptively to obtain points, (iv) rendering the points on a canvas for data annotation and representation, and (v) labelling the annotated and represented points to automatically generate the ground truth offsets to train the deep learning model.

In some embodiments, the method further includes, augmenting the historical atypical events in the historical sessions to train the deep learning model by, (i) isolating subsequences of the strokes of the historical atypical events, (ii) sampling the subsequences of the strokes of a current session and adding the subsequences of the strokes with the next sessions that do not contain the historical atypical events to obtain sampled subsequences, and (iii) ensuring the sampled subsequences are spatially disjoint from the strokes of the sessions by localizing the sampled subsequences.

In some embodiments, the one or more atypical events includes at least one of text, numericals, circles, or iconics, the at least one category related to any of the one or more atypical events present in the menu bar includes running hand letters, circles, arrows, question marks, sketch, individual letter, numbers In some embodiments, the method further includes (i) grouping the strokes into consecutive subsequences of erase strokes, and (ii) generating a new session by taking stroke subsequence from a first stroke of the concurrent sessions to a first stroke of one of erase subsequences.

Figure 9:
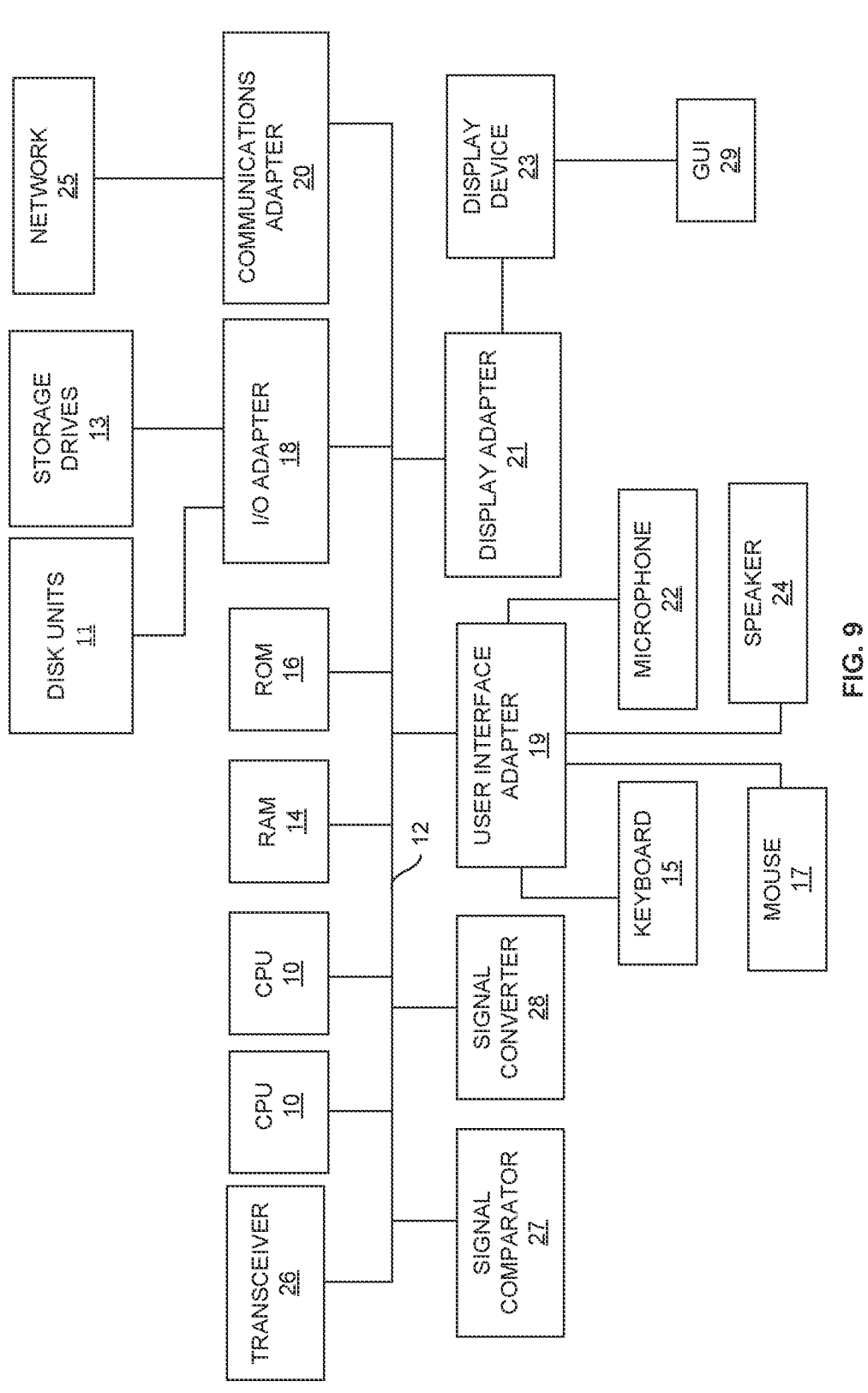
FIG. 9 is a schematic diagram of a computer architecture in accordance with the embodiments herein.

A representative hardware environment for practicing the embodiments herein is depicted in FIG. 9, with reference to FIGS. 1 through 8A and 8B. This schematic drawing illustrates a hardware configuration of an atypical activity detecting server 106/computer system/computing device in accordance with the embodiments herein. The system includes at least one processing device CPU 10 that may be interconnected via system bus 14 to various devices such as a random access memory (RAM) 12, read-only memory (ROM) 16, and an input/output (I/O) adapter 18. The I/O adapter 18 can connect to peripheral devices, such as disk units 38 and program storage devices 40 that are readable by the system. The system can read the inventive instructions on the program storage devices 40 and follow these instructions to execute the methodology of the embodiments herein. The system further includes a user interface adapter 22 that connects a keyboard 28, mouse 30, speaker 32, microphone 34, and/or other user interface devices such as a touch screen device (not shown) to the bus 14 to gather user input. Additionally, a communication adapter 20 connects the bus 14 to a data processing network 42, and a display adapter 24 connects the bus 14 to a display device 26, which provides a graphical user interface (GUI) 36 of the output data in accordance with the embodiments herein, or which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope.

What is claimed is:

1. A processor-implemented method for identifying and generating an alert, using a deep learning model, for a plurality of atypical events during an activity on an electronic whiteboard using a user device associated with a user, the method comprising:

receiving a plurality of canvases at concurrent sessions from a user device associated with a user, wherein each canvas comprises strokes, wherein each stroke is a timestamped scalable vector graphics element;

annotating the plurality of canvases by (i) displaying the strokes from each canvas of a session, (ii) assigning labels for the strokes by selecting at least one category related to any of the plurality of atypical events present, (iii) enabling an instance-level annotation for each category that comprises the strokes to select a contiguous group of sketches, and (iv) high-lighting the strokes belonging to the contiguous group of sketches to obtain annotated plurality of canvases;

detecting historical atypical events from the annotated plurality of canvases by (i) detecting, using an image-based object detection, the high-lighted strokes of the contiguous group of sketches to represent as spatially localized objects (ii) extracting a plurality of features from the spatially localized objects, and (iii) generating feature maps from the extracted features;

training the deep learning model by correlating the historical atypical events, historical bounding boxes with historical canvases in historical sessions to obtain a trained deep learning model;

processing, using the deep learning model, the plurality of canvases by determining a bounding box around each atypical event, thereby identifying the plurality of atypical events during the activity on the electronic whiteboard using the bounding box around each atypical event; and generating, using an event record table, the alert for identified plurality of atypical events by (i) recording atypical event information related to on-going sessions, (ii) analyzing, using a rule base method, the atypical event information to generate an appropriate alert by relaying to an appropriate session, thereby displaying the appropriate alert on a user interface of the user device associated with the user.

2. The processor-implemented method of claim 1, wherein the method comprises optimizing the trained deep learning model by calculating (i) a classification loss using confidence scores between ground truth offsets and predicted offsets, and (ii) a bounding-box localization loss using distance intersection over union (IoU) loss.

3. The processor-implemented method of claim 1, wherein the method further comprises, grouping the strokes of the historical atypical events into subsequences that are separated by erase stroke subsequences;

converting curves of the strokes to a point sequence representation;

down sampling, using ramer-douglas-peucker method, the point sequence representation adaptively to obtain points;

rendering the points on a canvas for data annotation and representation; and labelling the annotated and represented points to automatically generate the ground truth offsets to train the deep learning model.

4. The processor-implemented method of claim 1, wherein the method further comprises, augmenting the historical atypical events in the historical sessions to train the deep learning model by, isolating subsequences of the strokes of the historical atypical events;

sampling the subsequences of the strokes of a current session and adding the subsequences of the strokes with the next sessions that do not contain the historical atypical events to obtain sampled subsequences; and ensuring the sampled subsequences are spatially disjoint from the strokes of the sessions by localizing the sampled subsequences.

5. The processor-implemented method of claim 4, wherein the plurality of atypical events comprises at least one of text, numericals, circles, or iconics, wherein the at least one category related to any of the plurality of atypical events present in the menu bar of an annotation interface comprises running hand letters, circles, arrows, question marks, sketch, individual letter, numbers.

6. The processor-implemented method of claim 4, wherein the method further comprises, grouping the strokes into consecutive subsequences of erase strokes; and generating a new session by taking stroke subsequence from a first stroke of the concurrent sessions to a first stroke of one of erase subsequences.

7. One or more non-transitory computer-readable storage medium storing the one or more sequence of instructions, which when executed by the one or more processors, causes to perform a method for identifying and generating an alert for a plurality of atypical events on an electronic whiteboard using a deep learning model, comprising:

receiving a plurality of canvases at concurrent sessions from a user device associated with a user, wherein each canvas comprises strokes, wherein each stroke is a timestamped scalable vector graphics element;

annotating the plurality of canvases by (i) displaying the strokes from each canvas of a session, (ii) assigning labels for the strokes by selecting at least one category related to any of the plurality of atypical events, (iii) enabling an instance-level annotation for each category that comprises the strokes to select a contiguous group of sketches, and (iv) high-lighting the strokes belonging to the contiguous group of sketches to obtain annotated plurality of canvases;

detecting historical atypical events from the annotated plurality of canvases by (i) detecting, using an image-based object detection, the high-lighted strokes of the contiguous group of sketches to represent as spatially localized objects (ii) extracting a plurality of features from the spatially localized objects, and (iii) generating feature maps from the extracted features;

training the deep learning model by correlating the historical atypical events, historical bounding boxes with historical canvases in historical sessions to obtain a trained deep learning model;

processing, using the deep learning model, the plurality of canvases by determining a bounding box around each atypical event, thereby identifying the plurality of atypical events during the activity on the electronic whiteboard using the bounding box around each atypical event; and generating, using an event record table, an alert for identified plurality of atypical events by (i) recording atypical event information related to on-going sessions, (ii) analyzing, using a rule base method, the atypical event information to generate an appropriate alert by relaying to an appropriate session, thereby displaying the appropriate alert on an user interface of the user device associated with the user.

8. A system for identifying and generating an alert for a plurality of atypical events on an electronic whiteboard using a deep learning model, the system comprising:

a device processor; and a non-transitory computer-readable storage medium storing one or more sequences of instructions, which when executed by the device processor, causes receive a plurality of canvases at concurrent sessions from a user device associated with a user, wherein each canvas comprises strokes, wherein each stroke is a timestamped scalable vector graphics element;

annotate the plurality of canvases by (i) displaying the strokes from each canvas of a session, (ii) assigning labels for the strokes by selecting at least one category related to any of the plurality of atypical events, (iii) enabling an instance-level annotation for each category that comprises the strokes to select a contiguous group of sketches, and (iv) high-lighting the strokes belonging to the contiguous group of sketches to obtain annotated plurality of canvases;

detect historical atypical events from the annotated plurality of canvases by (i) detecting, using an image-based object detection, the high-lighted strokes of the contiguous group of sketches to represent as spatially localized objects (ii) extracting a plurality of features from the spatially localized objects, and (iii) generating feature maps from the extracted features;

train the deep learning model by correlating the historical atypical events, historical bounding boxes with historical canvases in historical sessions to obtain a trained deep learning model;

process, using the deep learning model, the plurality of canvases by determining a bounding box around each atypical event, thereby identifying the plurality of atypical events during the activity on the electronic whiteboard using the bounding box around each atypical event; and generate, using an event record table, an alert for identified plurality of atypical events by (i) recording atypical event information related to on-going sessions, (ii) analyzing, using a rule base method, the atypical event information to generate an appropriate alert by relaying to an appropriate session, thereby displaying the appropriate alert on an user interface of the user device associated with the user.

9. The system of claim 8, wherein the processor is configured to optimize the trained deep learning model by calculating (i) a classification loss using confidence scores between ground truth offsets and predicted offsets, and (ii) a bounding-box localization loss using distance intersection over union (IoU) loss.

10. The system of claim 8, wherein the processor is configured to;

group the strokes of the historical atypical events into subsequences that are separated by erase stroke subsequences;

convert curves of the strokes to a point sequence representation;

down sample, using ramer-douglas-peucker method, the point sequence representation adaptively to obtain points;

render the points on a canvas for data annotation and representation;

label the annotated and represented points to automatically generate ground-truth data to train the deep learning model.

11. The system of claim 8, wherein the processor is configured to augment the historical atypical events in the historical sessions to train the deep learning model by, isolating subsequences of the strokes of the historical atypical events;

sampling the subsequences of the strokes of a current session and adding the subsequences of the strokes with the next sessions that do not contain the historical atypical events to obtain sampled subsequences; and ensuring the sampled subsequences are spatially disjoint from the strokes of the sessions by localizing the sampled subsequences.

12. The system of claim 11, wherein the processor is configured to segment the received image into the plurality of classes by, extracting, using an encoder, the received image into at least one feature map to capture a plurality of features, wherein the plurality of features are captured using filters; and recovering, using a decoder, a resolution of the at least one feature map to obtain the plurality of classes.

13. The system of claim 8, wherein the plurality of atypical events comprises at least one of text, numericals, circles, or iconics, wherein the at least one category related to any of the plurality of atypical events present in the menu bar of an annotation interface comprises running hand letters, circles, arrows, question marks, sketch, individual letter, numbers.

14. The system of claim 8, wherein the processor is configured to:

grouping the strokes into consecutive subsequences of erase strokes; and generating a new session by taking stroke subsequence from a first stroke of the concurrent sessions to a first stroke of one of erase subsequences.

* * * * *